Aug. 28, 1951 A. P. JOHNSTONE ET AL 2,565,854
VARIABLE AREA PROPELLING NOZZLE
Filed Nov. 26, 1945 2 Sheets-Sheet 1
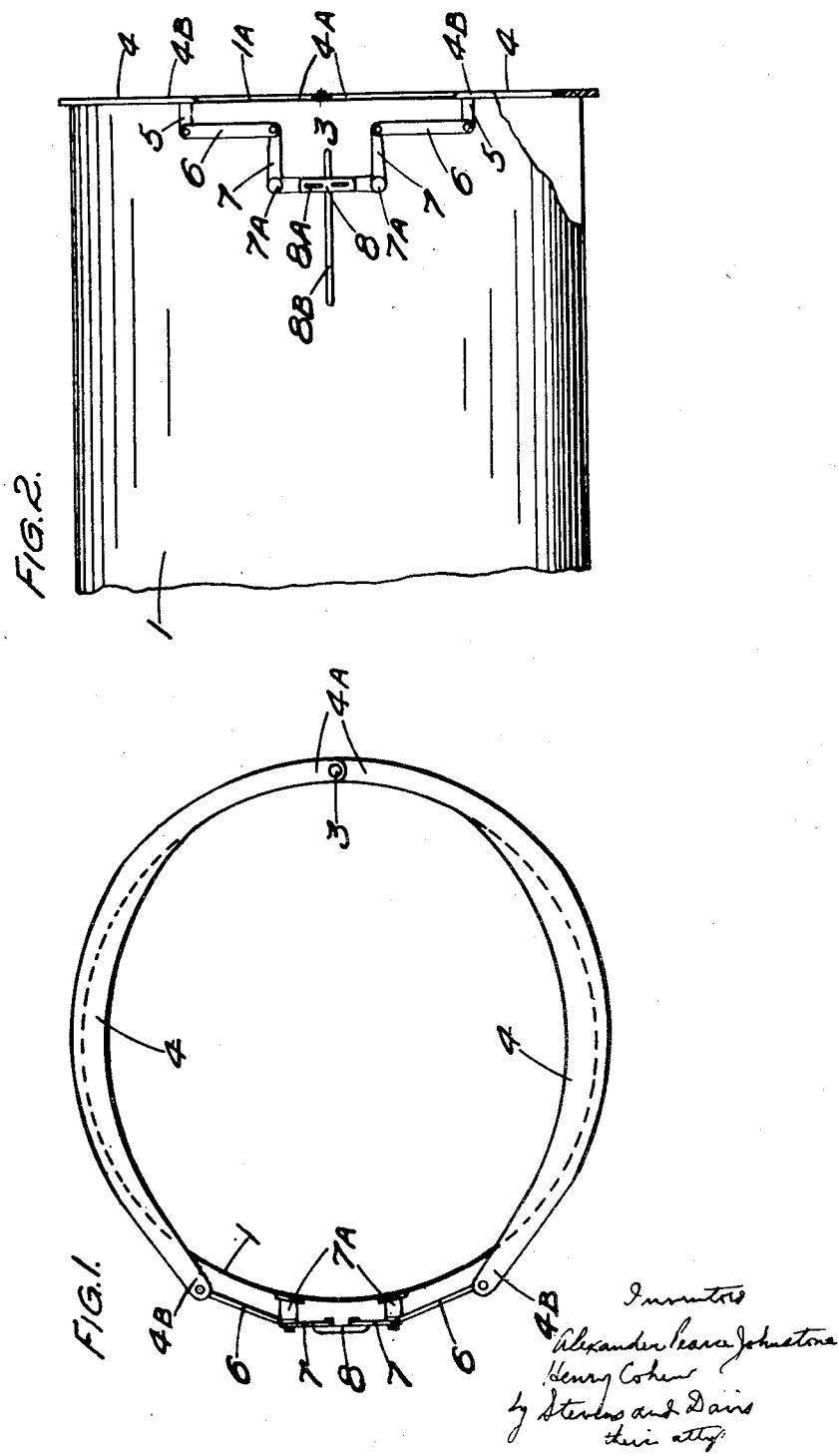

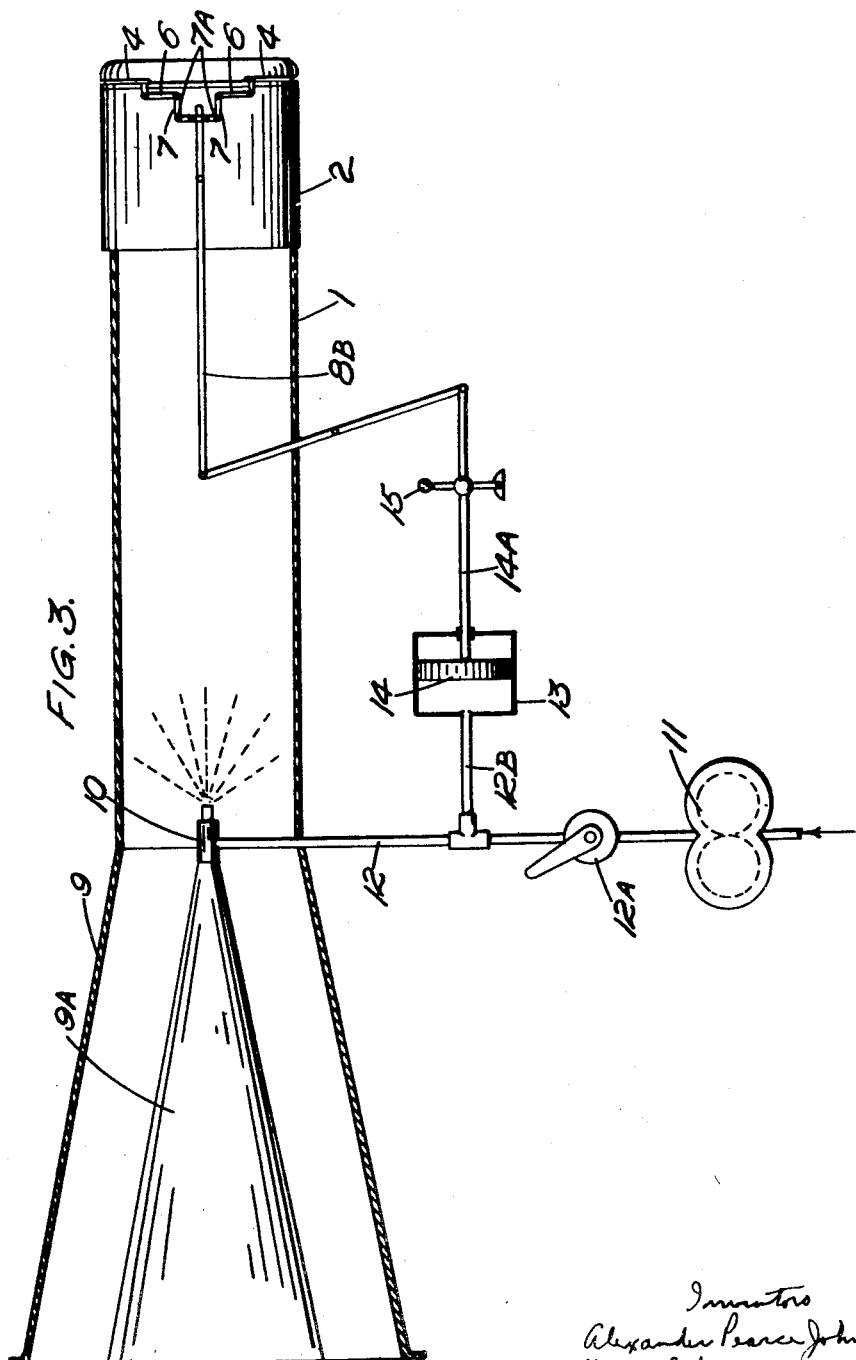

Patented Aug. 28, 1951

2,565,854

UNITED STATES PATENT OFFICE 2,565,854

VARIABLE AREA PROPELLING NOZZLE

Alexander Pearce Johnstone, Frimley, and Henry Cohen, Farnborough, England, assignors to Power Jets (Research & Development) Limited, London, England Application November 26, 1945, Serial No. 630,949
In Great Britain November 27, 1944

1 Claim. (Cl. 60—35.6)

This invention relates to variable area nozzles, such as may be required in jet propulsion systems or in analogous applications. It is desirable in regard to jet propulsion systems and especially if thrust augmentation is employed in one form or another, to achieve optimum operational conditions, to be able to vary the effective area of the propelling nozzle to the effect that the velocity of the leaving stream is under control by means other than the direct control of the prime mover and therefore of the rate of mass flow.

When out of use, it is practically speaking not exposed at all to the working fluid or the high temperature associated with propulsion jets. The surprising thing about the present device is that despite its apparent crudity it does not materially detract from efficiency, at least in cases actually tested.

In an embodiment preferred (by reason of its simplicity and tried effectiveness) for use in conjunction with a gas-turbine jet-propulsion aero engine, means are provided for varying the effective area of the propelling nozzle, comprising a pair of flat-plate obturator elements like a pair of outside-calipers, having corresponding ends on a common pivot (or on proximate adjacent pivots), the axis (or axes) of which is parallel to the direction of the jet forming a mounting radially outside the nozzle, the other ends of the elements being connected to operating means also outside the nozzle for swinging the elements, substantially in a common plane, more or less across the fluid stream of the nozzle.

The extent of movement need not be so great as the geometry of the device appears to suggest, because there appears to be a vena contracta effect which makes the effective nozzle area less than the geometric area.

Where unsymmetrical effects are required, as may be the case for example in aircraft propulsion to adjust the thrust line to particular requirements, it is possible to operate the obturators singly or asymmetrically.

A practical embodiment of the invention will now be described, by way of example. This is an application to the propelling nozzle of a gas-turbine jet-propulsion aero engine. It is illustrated by the accompanying diagrammatic drawings in which:

Fig. 1 is a view looking end on at the nozzle,
Fig. 2 is a side elevation,
Fig. 3 is a diagrammatic illustration of an inter-connection with a re-heat fuel supply.

The jet pipe 1 is of circular section and its downstream end, at 1A, forms the final orifice of the nozzle. An outer sleeve, 2, shown in Fig. 3, may be provided (it is not essential) to house working parts, to continue smoothly the external profile of a nacelle, or for other reason, and if provided it is appropriately fixedly mounted. A pivot is provided at 3, outside the nozzle and with its axis parallel to the direction of gas flow, and upon it are connected the corresponding ends 4A of two obturator elements 4. These elements are pieces of flat plate, and they are shaped, as seen, very like the arms of a pair of outside calipers familiar to engineers. The concave curve of the inner margin of the elements 4 is, in the main, made to correspond to the arcs of the end 1A of the nozzle, that is to say these margins are arcs of the same or nearly the same radius. The breadth of the elements is determined by allowing sufficient movement having regard to the intended "closed" position of the elements and in that condition the elements still overlap the end 1A of the nozzle. The free ends 4B of the elements are arranged so as to remain always outside the profile of the end 1A (as seen in Fig. 1) and they have lugs 5, (Fig. 2) to which are pivotally attached links 6, also pivotally attached to bell-cranks 7 (pivotally supported at 7A) the tails of which have pins working in slots 8A of a member 8 which is on the end of an operating push-pull rod 8B. The whole of this operating means may be housed within the sleeve 2. Pushing rod 8B obviously spreads the elements 4 apart and pulling brings them together. The operation of the rod 8B may be manual or by a suitable power source such as an electric or hydraulic jack.

Referring to Fig. 3, here is a schematic illustration of an interconnection between the area variation and a relatable factor, namely reheat of the jet gases. The exhaust pipe 1 is supplied from a turbine exhaust annulus structure comprising outer pipe 9 and internal fairing or "bullet" (as it is frequently called) 9A. At the trailing end of the bullet 9A is a fuel burner, represented at 10, supplied with fuel under pressure from a pump 11 and fuel pipe 12 with a manual throttle valve 12A. This is intended to represent a re-heat system. From the pipe 12 is branched a pipe 12B leading into a cylinder 13 with a piston 14 connected by a rod 14A to the hand lever 15 which operates the rod 8B. When re-heat is off, (valve 12A shut) the pilot can use the lever 15 at will. When the re-heat is on and sufficient fuel pressure is exerted in the cylinder 13, the lever 15 is pushed by the piston 14, towards the "open" position. Thus the act of turning on the re-heat will open the propelling nozzle, or if already open will prevent closing up the nozzle or at least remind the pilot not to close it. Obviously by appropriate elaboration, the operation of varying the nozzle may be made automatically dependent on the use of the reheat system, either in terms of extremes of movement or proportionally. The simple example of Fig. 3 is intended to show only one of the various interconnections which may be provided, where functionally inter-related devices are provided.

We claim:

In an aircraft jet propulsion system the combination of a jet pipe having therein a jet discharge orifice for discharging jet fluid in a patterned path, a pair of long and narrow flat plate obturator elements, means mounting said elements adjacent said orifice for movement in a plane substantially transverse to the direction of flow of fluid discharged from said orifice from a first position in which each of their longitudinal edges does not project into the path of the fluid issuing from said orifice to a second position in which said edges enter said path whereby said elements partially obstruct said orifice and reduce the effective cross-sectional area of said orifice thus increasing the discharge velocity of said fluid jet, means arranged adjacent said pipe and said orifice for effecting conjoint movement of said elements between said first and second positions, a re-heat burner system in said pipe, a fuel supply and control system including a control valve and a pressure fuel pump for said burner system, a fuel pressure operated piston type servo-motor connected to the fuel supply system and having its piston connected to said element moving means to move said elements to the first position in response to supplying fuel to said re-heat burners.

ALEXANDER PEARCE JOHNSTONE.
HENRY COHEN.

REFERENCES CITED

The following references are of record in the file of this patent:

UNITED STATES PATENTS

| Number | Name | Date |
| --- | --- | --- |
| 81,257 | Cushman | Aug. 18, 1868 |
| 147,107 | Dampman | Feb. 3, 1874 |
| 595,014 | Doolittle | Dec. 7, 1897 |
| 1,116,741 | Roney | Nov. 10, 1914 |
| 1,572,812 | Rees | Feb. 9, 1926 |
| 1,881,486 | Gilstrap | Oct. 11, 1932 |
| 2,037,663 | Lalor | Apr. 14, 1936 |
| 2,181,261 | Breese | Nov. 28, 1939 |
| 2,280,835 | Lysholm | Apr. 28, 1942 |
| 2,356,557 | Anxionnaz et al. | Aug. 22, 1944 |
| 2,408,099 | Sherman | Sept. 24, 1946 |

FOREIGN PATENTS

| Number | Country | Date |
| --- | --- | --- |
| 8,924 | Great Britain | June 13, 1884 |
| 699 | Great Britain | Jan. 16, 1886 |